US007855754B2

(12) United States Patent
Maxson

(10) Patent No.: US 7,855,754 B2
(45) Date of Patent: Dec. 21, 2010

(54) TELEVISION DISPLAY COVER

(76) Inventor: Peter H. Maxson, 8 Hudson, Irvine, CA (US) 92620

( * ) Notice: Subject to any disclaimer, the term of this patent is extended or adjusted under 35 U.S.C. 154(b) by 1511 days.

(21) Appl. No.: 11/219,034

(22) Filed: Sep. 1, 2005

(65) Prior Publication Data

US 2007/0046843 A1 Mar. 1, 2007

(51) Int. Cl.
*H04N 5/645* (2006.01)
(52) U.S. Cl. ...................................... 348/825
(58) Field of Classification Search ................. 348/841, 348/151, 818, 825, 836, 842; 312/7.2; 318/265, 318/266, 267, 286, 466; 359/612
See application file for complete search history.

(56) References Cited

U.S. PATENT DOCUMENTS 2,805,059 A * 9/1957 Green ........................ 477/15
5,264,765 A * 11/1993 Pecorino et al. ............. 318/265

* cited by examiner

*Primary Examiner*—Benny Q Tieu
*Assistant Examiner*—Jeremiah A Bryar
(74) *Attorney, Agent, or Firm*—Niky Economy Syrengelas, Esq.; K. David Crockett, Esq.; Crockett & Crockett

(57) ABSTRACT

A television display cover for covering the screen of a plasma or LCD screen when the television is not in use. The cover can be converted from existing frames, framed art, or mirrors already contained in a users' home or wall or panel for attachment of the display cover. A housing containing driving means is secured to a wall or recessed surface. The television display cover is then secured to the outside face of the housing. The cover can then be pivoted to an open or closed position to either expose the television display or cover it up.

24 Claims, 5 Drawing Sheets

TELEVISION DISPLAY COVER

FIELD OF THE INVENTIONS

The inventions described below relate to the field of screen covers as they apply particularly to plasma screen television covers, flat screen television covers white boards, control panels and speakers.

BACKGROUND OF THE INVENTIONS

Plasma televisions have been popularized as an alternative to tube televisions. The flat panel displays appeal to consumers for their visual distinction as well as non-conventional display options. The plasma technology allows for televisions to be dimensioned in shapes not traditionally available. Unlike conventional televisions, plasma screen televisions can be mounted onto any one of several structures, including walls. The framework is much more lightweight and the total thickness of the plasma televisions are much more slender than the conventional television sets. The configuration affords the owner the option of hanging the plasma television from a wall within a selected room or in a bookcase. The drawback of hanging the plasma television from a wall is that the television then becomes the focal point of any room within which it is contained. This creates a problem in discretely While some plasma screen covering devices currently exist in the marketplace, these devices are tremendously expensive. When the price of a covering is added to the cost of the plasma television itself, this can raise the overall cost an exorbitant amount. Additionally, these coverings require the user to select a new covering rather than allowing the covering to be used with their existing framed art or mirror. This dictates the form that the art may be in that it is generally only printed on pliable canvas thereby limiting a person purchasing new art to the form of thinly applied ink or paint on a canvas. Additionally, the frame cannot be hidden and it is always in view. This limits the option to present a theater type presentation in a traditional ornate frame. Further, the art may not be easily changed out for seasonal preferences. Additionally, the prior covers cannot be used within cabinets or book cases, they can only be used on walls. Also, the prior covers require that they be in the exact size of the television screen itself. Finally, the plasma television can experience a great deal of glare and reflection on the television screen. These limitations have been overcome by the new device described below.

SUMMARY

The device described below provides for easy, efficient, and economical concealment of a plasma or LCD screen when the television is not in use. The cover can be converted from existing frames, framed art, or mirrors already contained in a user's home. The artwork chosen is typically sized and dimensioned to cover the screen and surround hardware of the LCD, plasma display or television. The cover can be used with wall or cabinet mounted televisions. The wall mounted televisions may further include those mounted directly onto the face of a wall or alternatively within a recess in a wall.

With a wall-mounted configuration, a housing containing a driving means is attached to the backside of a television screen cover. The housing has a front face plate and a back face plate wherein the front face plate of the housing is mounted to the back of the television display cover and the back face plate is secured to a vertical surface. The housing is sized and dimensioned to place the television display cover on a plane parallel to the screen of the display. The housing contains the driving means that assists in lifting the television display cover for viewing of the television screen. The driving means is contained within the housing and comprises an actuator or motor coupled to a first gear and a drive shaft coupled to a second gear. The drive shaft is positioned horizontally relative to the motor or actuator. The two gears are adapted to control the rate of speed with which the television display cover is raised and lowered. At both extreme ends, the shaft is attached to the first ends of two extendable arms. The extendable arms are attached at their second ends to the front face plate of the housing to assist the housing in lifting the television screen display cover. The extendable arms are also secured to a spring or other suitable device that is acted upon by the driving means. Once the driving means acts upon the spring or other suitable device, the spring acts to pivot the extendable arms from a first retracted position wherein the television display is covered to a second extended position where the display is visible for viewing. Alternatively, the driving means may be configured without springs or other tensioning devices and allow the movement of the cover completely by the motor or actuator.

In a retracted position, the display cover conceals the television screen secured beneath it. The display cover can be decorated with artwork on its front surface when the display is in the retracted position. Alternatively, the display cover can be a mirror, white board, or other ornate depiction. The user simply starts the motor which causes the motor gear to act upon the shaft gear. Movement of the shaft activates the pneumatic springs which pivot the extending arms so that the television display cover is moved to an opened or extended position. The extendable arms retract and lock the display cover into a position approximately 90 degrees from the wall on which the television is mounted. This allows the television display panel to be visible for viewing and additionally limits glare and reflection on the television screen. Alternatively, the extendable arms may extend and lock the display cover so that it lies flush against the wall such that the television display cover is hidden. This position may be preferred where a theater type environment is not desired, but instead a full view of the television screen is desired.

Alternatively in a configuration where the television is mounted within a cabinet, a recessed portion of a wall, or an enclosure created by the framing of the artwork, the housing is affixed within the top of the recessed area. The recessed area may be within a cabinet or alternatively within a recessed portion of a wall sized specifically to the dimensions of the flat screen television. The recess may be dimensioned to cut away only at the drywall layer of the wall or may alternatively be cut at a greater depth so that the television may be mounted directly into the studs or other supporting structure contained within the walls. The housing is mounted within the recess and the television display cover is attached to the front face plate of the housing. Once again, the motor and motor gear causes rotation of the shaft gear and the shaft. This generates movement of the pneumatic springs which pivot the extending arms so that the television display cover is moved to an opened or extended position.

The display cover may be a mirror, a two-way mirror, or a framed or unframed piece of art. Additionally, the display cover may be a paneling or other substrate to which any other desired cover item could be fastened. For example, a white board may be attached to the paneling and serve as a cover for rooms such as conference rooms. The display cover may be any suitable artwork.

DETAILED DESCRIPTION OF THE INVENTIONS

Figure 1:
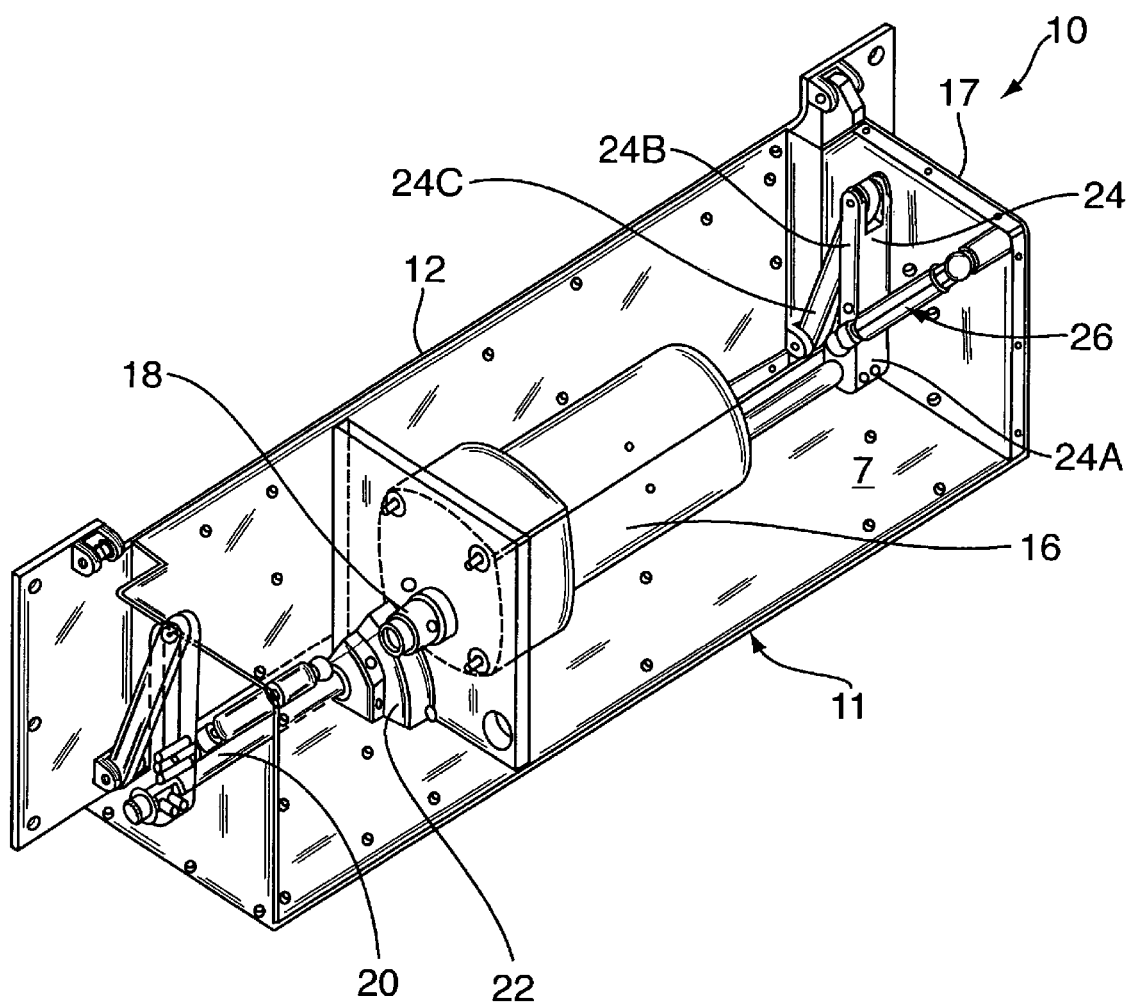
FIG. 1 is a view of the television display concealment device with its associated driving means.

FIG. 1 is a view of the television display concealment device 10 with its associated driving means. The television display concealment device 10 is comprised of a housing 11 having a rigid planar front panel 12 rotatably coupled by a hinge, a rigid planar back panel 14, side panels 17, a top panel 6, and a bottom panel 7; a driving means within the television display concealment device 10; a set of extendable arms 24 and a set of springs 26. The mechanical driving means are contained within the television display concealment device 10. The driving means assists in the lifting and closing of the television display cover 15 and comprises an actuator or motor 16 coupled to a first gear 18 and a drive shaft 20 coupled to a second gear 22. The drive shaft 20 is positioned horizontally relative to the motor 16 and the two gears 18 and 22 are positioned adjacent to each other so that movement from one gear acts to initiate movement in the other gear. As illustrated, the extendable arm 24 comprises three sections: sections 24A, 24B and 24C. A first extendable arm 24 is coupled at section 24A to one end of the shaft 20 and coupled at section 24C to the front rigid planar panel 12. An identical second extendable arm 24 is coupled at its section 24A to the other end of the shaft 20 and coupled at its section 24C to the front rigid planar panel 12. The extendable arms 24 are also secured to a spring 16 or other suitable tensioning device 26.

The motor 16 drives the first gear 18 coupled to the motor 16. In FIG. 1, the first gear 18 is separated from the motor 16 by a mounting plate 28. Separation of the motor 16 from the gear by the mounting plate 28 is optional. The first gear 18 then acts upon the second gear 22 that is rotationally fixed to the shaft 20. In FIG. 1 this second gear 22 is a quarter or pie gear. As an alternative to the gears, the motor 16 may act upon a chain or belt drive (not pictured) in order to move the television display cover 15.

The shaft 20 is attached to section 24a of two extendable arms 24. The arms 24 are attached at section 24C to either the front rigid planar panel 12 or alternatively directly to the back of the television display cover 15. In FIG. 1 the extendable arms 24 are in the collapsed position. Once acted upon by the shaft 20, the extendable arms 24 can be extended or collapsed at a rate of speed controlled by the motor 16.

The extendable arms 24 are also secured to a spring 26 or other suitable tensioning device that is capable of being acted on either manually or by the driving means. The springs 26 are coupled to both the extendable arms 24 as well as to the rigid planar back panel 14 or side panel 17. Other suitable tensioning devices include dampers, linear actuators, electrical cylinders, lid upper holders, gas springs or any combination thereof.

In alternative configurations of the television display concealment device, the device is provided without a motor. Here, here the driving means comprises slight manual lifting of the television display cover 15 by a user of the device. In this configuration, initiation of the force of the gas spring is performed by moving the television display cover 15 such that the gas springs 26 pass their neutral state and begin to lift the television display cover with their own force. Once the gas springs are fully opened, the television display cover 15 is locked into position. Once open and locked into position, the television display cover 15 can be closed by initiating movement of the cover 15 by hand to compress the gas springs past the neutral position to start the closing of the gas spring. In further configurations of television display concealment device, television display cover 15 may be raised or lowered by a motor without gas springs, a tensioning means alone or a combination of tensioning means and a motor or actuator. Additionally, the motor may be a cylindrical motor that turns a shaft or turns around a shaft. By way of example and not limitation, Somfy™ uses such motors to raise and lower shade blinds and curtains.

Figure 2:
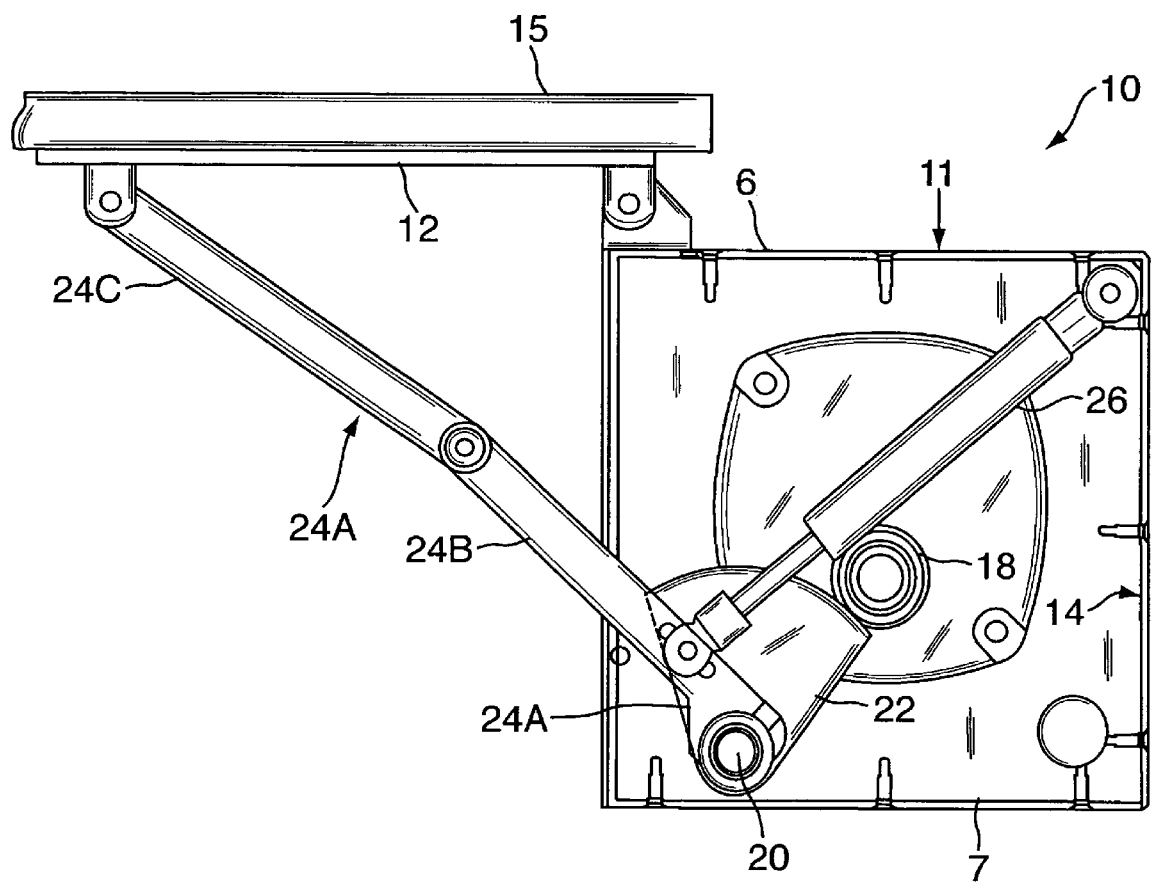
FIG. 2 is a side view of the television display concealment device where the television concealment device is in an open or extended position.

FIG. 2 is a side view of the television display concealment device 10 where the television concealment device 10 is in an open or extended position. This Figure illustrates the configuration of the extendable arm 24 relative to the shaft 20, gears 18 and 22 and spring 26. The spring 26 is attached at one end to the housing 11 (either to the planar back panel 14 or side panel 17) and is mounted in an orientation where the axis of the spring is approximately at a 45 degree angle relative to the rigid planar back panel 14. The second end of the spring 26 is secured to the extendable arm 24, providing upward force on the arm 24. One end of the shaft 20 is also secured to the extendable arm 24 at a distance from the spring. As illustrated, the extendable arm comprises sections 24A, 24B and 24C, and the spring 26 is rotatably fixed to the area at a joint between the arm sections 24A and 24B. Also, the second or shaft gear 22 is secured to the shaft and is adjacent to the first or motor gear 18. The front rigid planar panel 12 may be rotatably extended to a 90 degree angle relative to the wall as depicted in this Figure. This configuration creates a theater type environment and reduces the amount of glare on the television screen. Alternatively, where a theater type setting is not desired, the front rigid planar panel 12 may be lifted 180 degrees until the display cover 15 lies flush with a wall. Additionally, the glare on the television may be reduced by the inclusion of curtains or other glare protection devices in conjunction with the concealment device 10. The curtains can be positioned on the side edges of the television display cover 15. Once the display cover is in the open or extended position, the curtains create a box like effect so that the television display screen is entirely surrounded. The use of the curtains reduces the amount of light that reaches the television display screen and enhances the overall viewing experience.

Figure 3:
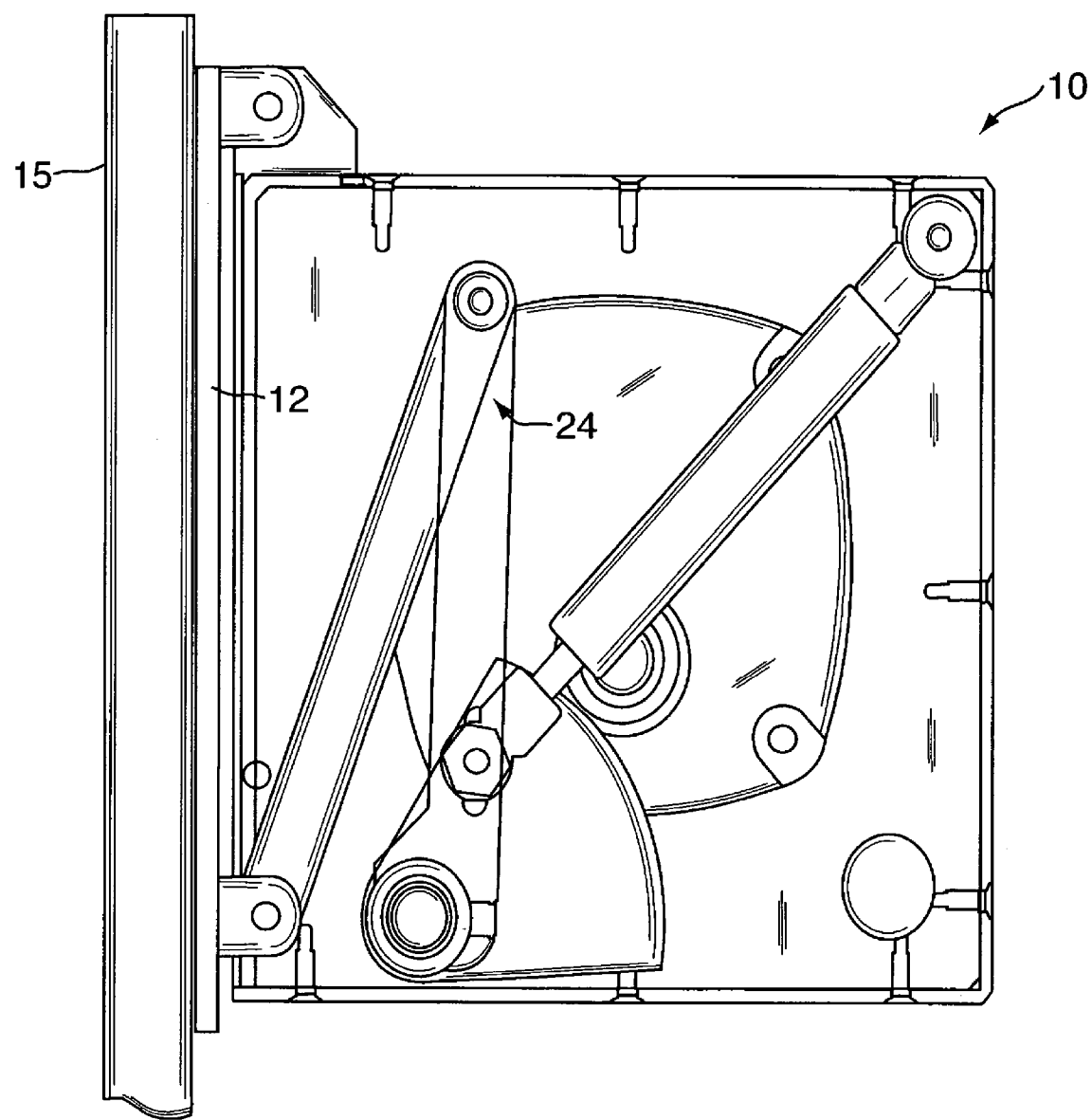
FIG. 3 is a side view of the television display concealment device where the television concealment device is in a closed or retracted position.

FIG. 3 is a side view of the television display concealment device 10 where the television concealment device 10 is in a closed or retracted position. The extendable arm 24 is retracted or closed, pulling the television display cover 15 down over the television display.

In addition to being mounted to a wall, the television display concealment device 10 may also be mounted within a recess or cavity. For example, the television display concealment device 10 may be mounted either into a cabinet or into a recess in a wall. The front rigid planar panel 12 is then secured to the television display cover 15 within the recess such that the television concealment device ultimately lies entirely within the recessed portion. The function of the driving means is identical to that described above.

The television display concealment device 10 may optionally contain speakers for audio enhancement of the device. The speakers can be positioned on the top, bottom or sides of an enclosure with the housing 11. The speakers may be visible or camouflaged within the enclosure with the housing depending on the viewer's preference. Alternatively, the speakers can be enclosed in the television display cover that is being lifted and lowered to allow the sound to be closer to the user when the television is in use.

Figure 4:
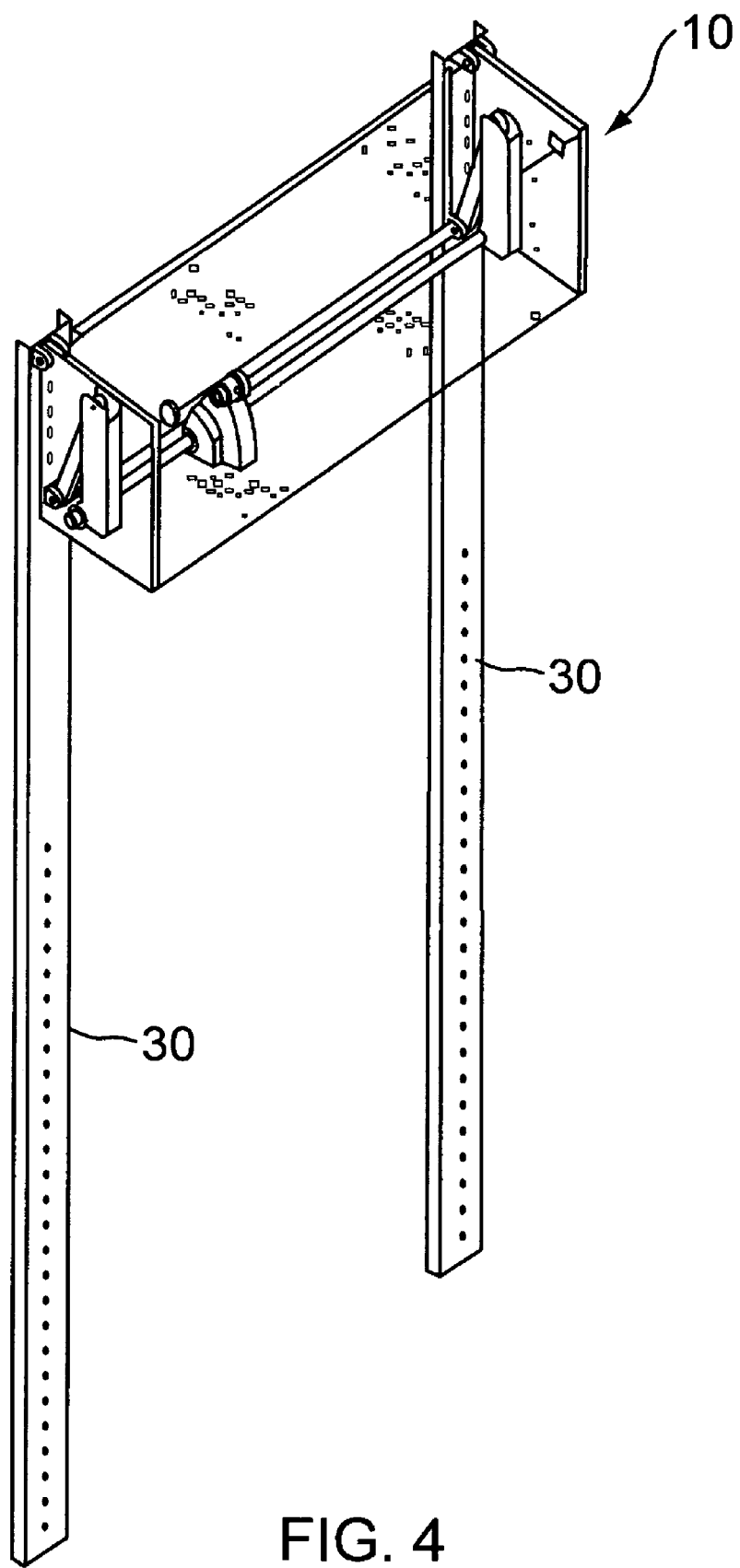
FIG. 4 illustrates a configuration of the television display concealment device having display cover supports.
Figure 5:
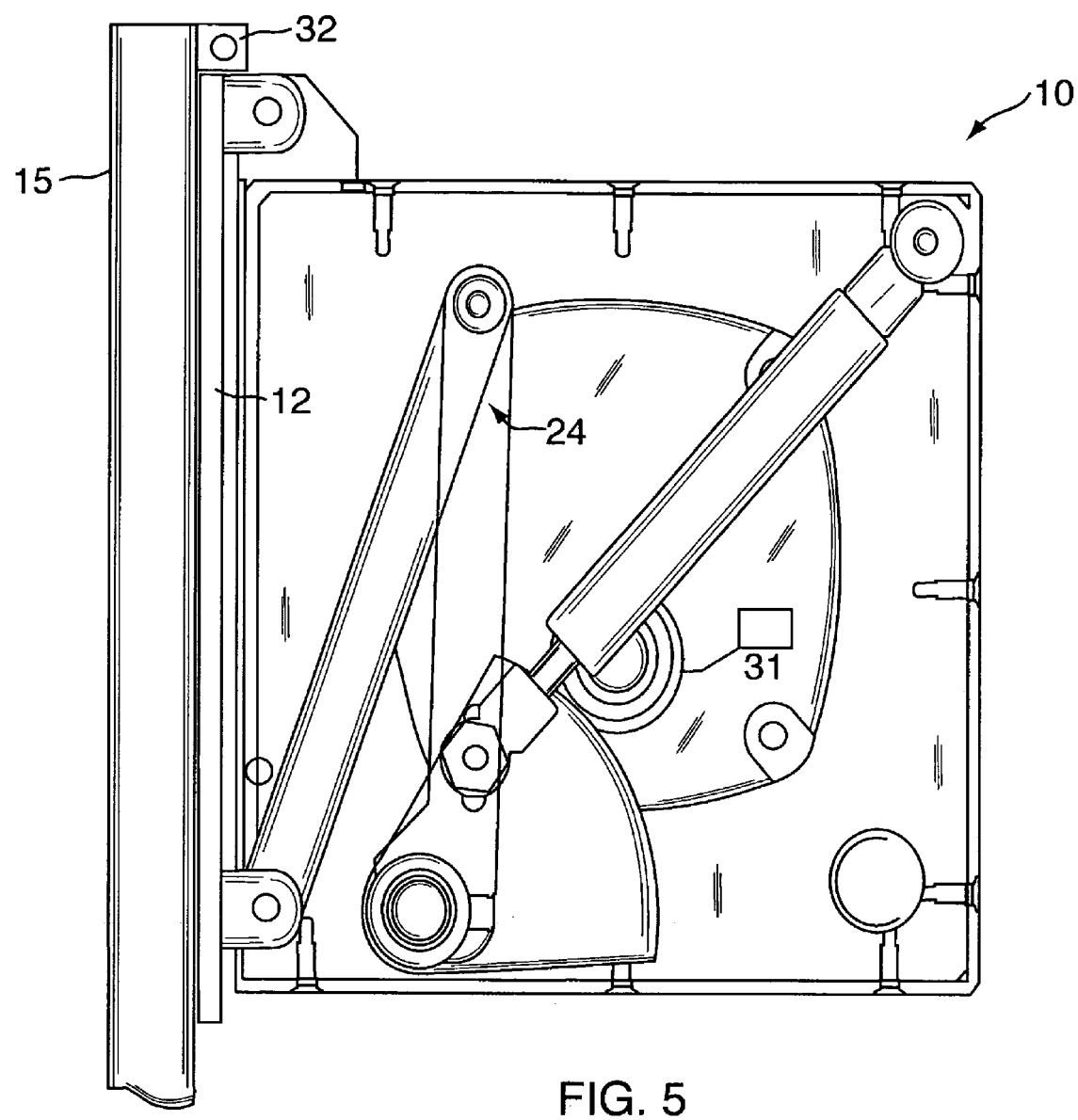
FIG. 5 illustrates a configuration of the television display concealment device having an object detector and a quick release hinge.

FIG. 4 illustrates an alternative configuration of the television display concealment device 10. Larger television display covers 15 are more massive and thus require additional support when being moved. The television display concealment device shown in FIG. 4 further comprises cover supports 30 coupled to the rigid planar panel 12. The cover supports 30 extend out and perpendicular to the rigid planar panel 12 and may be manufactured from steel, aluminum, or any other rigid material. The cover supports 30 provide addition support behind the television display cover 15 when the display cover 15 is being moved by the display concealment device 10. The cover supports 15 may be a discreet length or extendable to accommodate various sizes of television display covers.

Figure 6:
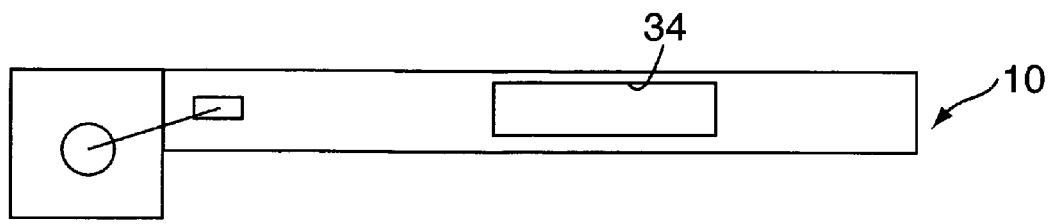
FIG. 6 illustrates a configuration of the television display concealment device having weights in the display cover.

Safety for people around the television display concealment device 10 and for the television display cover 15, is taken into account by features of the television display concealment device 10. FIG. 6 illustrates some of the safety features found in the television display concealment device 10. The concealment device 10 may incorporate an object detector 31 such as load cell, torque sensor, touch sensor, heat sensor, or infrared sensor to detect a person or object in the path of the television display cover when the television display concealment device is being extended or retracted. The object detector 31 in FIG. 6 is a torque sensor coupled to the motor 16. The torque sensor detects a change in torque in the motor caused by an object obstructing the movement of the display cover 15. When in use, the object detector 31 detects an obstruction in the path of the television display cover 15 when the television display concealment device is being extended or retracted. If an object is detected by the object detector 31, the motor 16 stops the movement of the display cover 15 or alternatively, the motor 16 reverses and brings the display cover 15 to the starting position prior to being extended or contracted.

Another safety feature of the television display concealment device 10 is an alternative manner of attachment for the display cover 15 to the rigid planar panel 12. The display cover 15 may be attached directly to the cover supports 30 by fasteners such as screws, bolts, rivets, press fit fasteners, adhesives, and the like. The fastening of the display cover to the display supports enables the display cover 15 and cover supports 30 to move as one unit when the television display concealment device 10 is retracting or extending. However, for additional safety, the cover may be coupled to the rigid planar panel 12, by a quick-release hinge 32 and not directly fastened to the supports. The quick-release hinge enables easy attachment of the display cover 15 to the rigid planar panel 12 while the display rests against the display supports. In addition, the hinge allows the display cover to stop moving while the supports continue to retract should the display cover come into contact with an object while retracting. The hinge 32 also allows a user to lift the display cover 15 without using the television display concealment device 10.

FIG. 6 illustrates a configuration of the television display concealment device containing weights 34 in the display cover. Where no motor is provided, the rate at which the television display concealment device lifts must be controlled. Advantageously, one size gas spring may be used for any size television display cover. Weights may be inserted at predetermined positions along the support arms of the television display cover 15 to control the rate at which the display cover retracts in to the open or extended position. The smaller the display cover is, the more weight must be added in order to retard the rate at which the display cover retracts. The larger the display cover, the less weight must be added to slow the retraction rate.

Thus, while the preferred embodiments of the devices and methods have been described in reference to the environment in which they were developed, they are merely illustrative of the principles of the inventions. Other embodiments and configurations may be devised without departing from the spirit of the inventions and the scope of the appended claims.

I claim:

1. A mountable television display concealment device capable of concealing a television display, said concealment device comprising:

a housing comprising at least a moveable rigid planar front panel and a rigid planar back panel;

driving means contained within the housing and comprising an electric motor coupled to a drive shaft, the drive shaft being positioned horizontally relative to the motor;

a first extendable arm coupled at one end to a first end of the shaft and at the second end to the moveable rigid planar front panel;

a second extendable arm coupled at one end to a second end of the shaft and at the second end to the back of the moveable rigid planar front panel; and a set of tensioning means each fixed at a first end to the rigid planar back panel and at a second end to one of the extendable arms;

wherein the shaft is adapted to be rotatably acted upon by the motor such that the shaft engages the tensioning means to pivot the extendable arms from a first retracted position to a second extended position wherein a television display cover coupled to the rigid planar front panel covers the television display when said extendable arms are in said first retracted position and said television display is visible for viewing when said extendable arms are in said second extended position;

wherein the rigid planar back panel of the housing is adapted for securing to a vertical surface.

2. The device of claim 1 wherein the television display cover is comprised of a mirror.

3. The device of claim 1 wherein the television display cover is comprised of a piece of art.

4. The device of claim 1 wherein the television display cover is comprised of a white board.

5. The device of claim 1 wherein the vertical surface is a wall.

6. The device of claim 1 wherein the vertical surface is a recessed cabinet.

7. The device of claim 1 wherein the vertical surface is a recessed wall.

8. The device of claim 1 wherein the set of tensioning means are gas springs.

9. The device of claim 1 wherein the set of tensioning means are linear actuators.

10. The device of claim 1 wherein the set of tensioning means are electric cylinders.

11. The device of claim 1 further comprising an object detector.

12. The device of claim 11 wherein the object detector comprises any one of the following: torque sensor, pressure sensor, infrared sensor, heat sensor, load sensor, and touch sensor.

13. The device of claim 1 further comprising a cover support coupled to the moveable rigid planar front panel.

14. The device of claim 1 further comprising a quick release hinge coupling the display cover to the moveable rigid planar front panel.

15. The device of claim 1 further comprising audio speakers contained within the housing.

16. The device of claim 1 further comprising curtains contained on the sides of the television display cover.

17. The device of claim 1 further comprising at least one weight positioned at a predetermined position in the television display cover.

18. A mountable television display concealment device capable of concealing a television display, said concealment device comprising:
- a housing comprising a moveable rigid planar front panel, a rigid planar back panel, side panels, a top panel, and a bottom panel;
- driving means contained within the housing and comprising an electric motor coupled to a drive shaft, the drive shaft being positioned horizontally relative to the motor;
- a first extendable arm coupled at one end to a first end of the shaft and at the second end to the moveable rigid planar front panel;
- a second extendable arm coupled at one end to a second end of the shaft and at the second end to the back of the moveable rigid planar front panel; and
- a set of tensioning means each fixed at a first end to a side panel and at a second end to one of the extendable arms;
- wherein the shaft is adapted to be rotatably acted upon by the motor such that the shaft engages the tensioning means to pivot the extendable arms from a first retracted position to a second extended position wherein a television display cover coupled to the rigid planar front panel covers the television display when said extendable arms are in said first retracted position and said television display is visible for viewing when said extendable arms are in said second extended position; wherein the side panels, top panel, bottom panel, or rigid planar back panel of the housing is adapted for securing to a vertical surface.

19. The device of claim 18 further comprising an object detector.

20. The device of claim 18 further comprising a cover support coupled to the moveable rigid planar front panel.

21. The device of claim 18 further comprising a quick release hinge coupling the display cover to the moveable rigid planar front panel.

22. The device of claim 18 further comprising audio speakers contained within the housing.

23. The device of claim 18 further comprising curtains contained on the sides of the television display cover.

24. The device of claim 18 further comprising at least one weight positioned at a predetermined position in the television display cover.

* * * * *